(12) United States Patent
Kreuzer et al.

(10) Patent No.: US 11,078,370 B2
(45) Date of Patent: Aug. 3, 2021

(54) MOTOR VEHICLE STRUCTURAL COMPONENT AND CORROSION PROTECTING METHOD

(71) Applicant: Ford Global Technologies, LLC, Dearborn, MI (US)

(72) Inventors: Bernhard Kreuzer, Bergisch Gladbach (DE); Frank Timm, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 16/455,895

(22) Filed: Jun. 28, 2019

(65) Prior Publication Data

US 2020/0040199 A1 Feb. 6, 2020

(30) Foreign Application Priority Data

Aug. 3, 2018 (DE) .......................... 102018213001.9

(51) Int. Cl.
| | | |
|---|---|---|
| *B23K 11/11* | (2006.01) | |
| *B62D 27/02* | (2006.01) | |
| *C09D 5/08* | (2006.01) | |
| *B23K 101/00* | (2006.01) | |

(52) U.S. Cl.
CPC ............... *C09D 5/08* (2013.01); *B23K 11/11* (2013.01); *B62D 27/023* (2013.01); *B23K 2101/006* (2018.08)

(58) Field of Classification Search
CPC .... C09D 5/08; B23K 11/11; B23K 2101/006; B62D 27/023; B62D 29/007; B62D 25/00
See application file for complete search history.

(56) References Cited

U.S. PATENT DOCUMENTS

| | | | | |
|---|---|---|---|---|
| 7,150,391 | B2 * | 12/2006 | Fujimoto ............. | B23K 9/0026 |
| | | | | 228/252 |
| 2012/0270060 | A1 * | 10/2012 | Wibbeke ................ | B62D 25/04 |
| | | | | 428/594 |
| 2016/0046330 | A1 * | 2/2016 | Elfwing ................. | B62D 21/02 |
| | | | | 296/193.01 |

FOREIGN PATENT DOCUMENTS

| | | | | |
|---|---|---|---|---|
| DE | | 3222766 A1 * | 12/1983 | ......... B62D 25/2072 |
| DE | 102012013882 | | 6/2013 | |
| DE | 102012013882 | A1 * | 6/2013 | ............. B23K 11/11 |

\* cited by examiner

*Primary Examiner* — Daniel J. Schleis
*Assistant Examiner* — Kevin C T Li
(74) *Attorney, Agent, or Firm* — Carlson, Gaskey & Olds, P.C.; David Coppiellie, Esq.

(57) ABSTRACT

A motor vehicle structural component includes a first metal sheet and a second metal sheet placed against the first metal sheet. The first and second metal sheets are joined together in some areas. A gap is provided between the first and second metal sheets in the regions between the areas where the first and second metal sheets are joined together. The gap is configured to receive a coating material. At least one of the first or the second metal sheets includes at least one hole. Each hole opens to the gap and is configured to convey an inflow of the coating material to the gap.

18 Claims, 3 Drawing Sheets

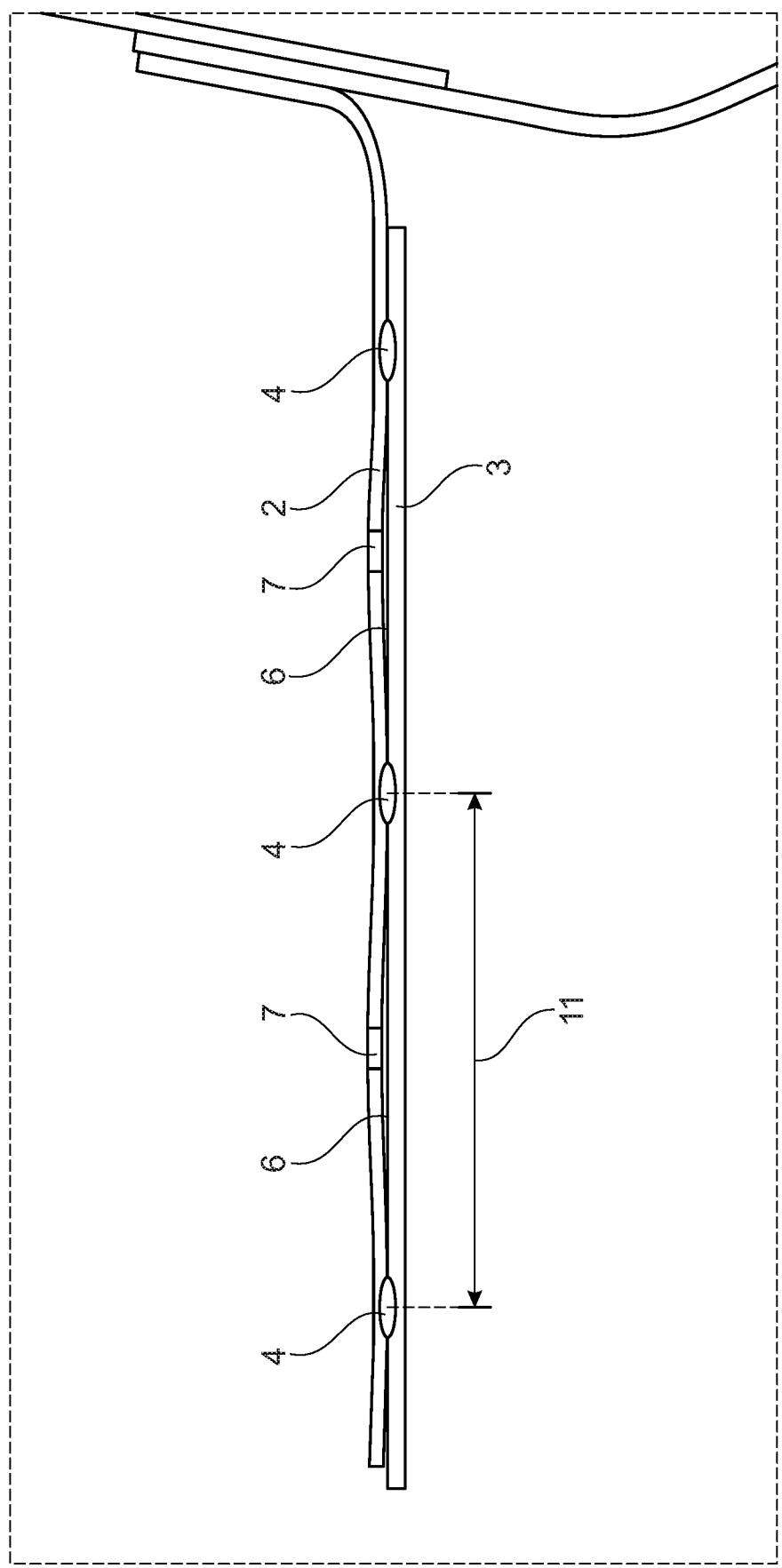

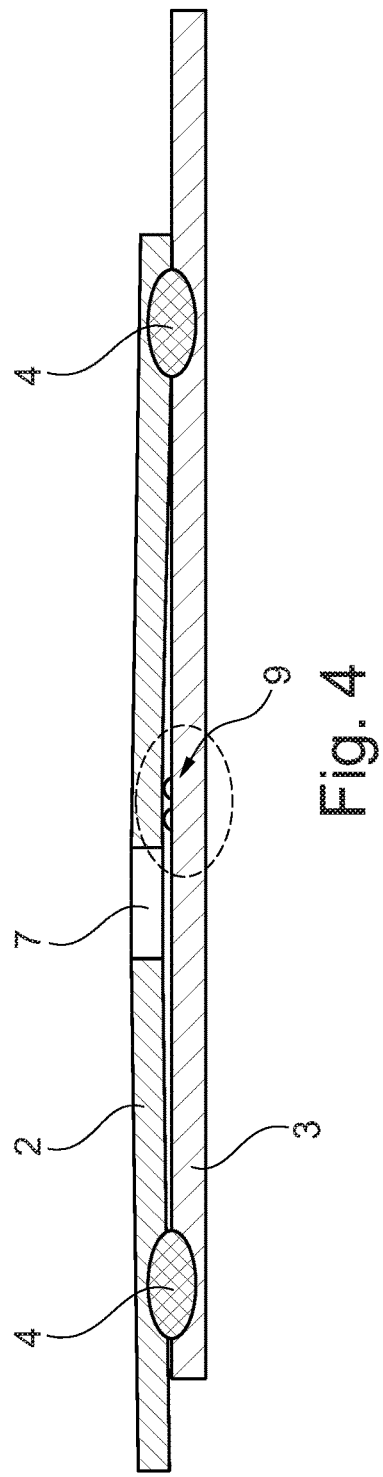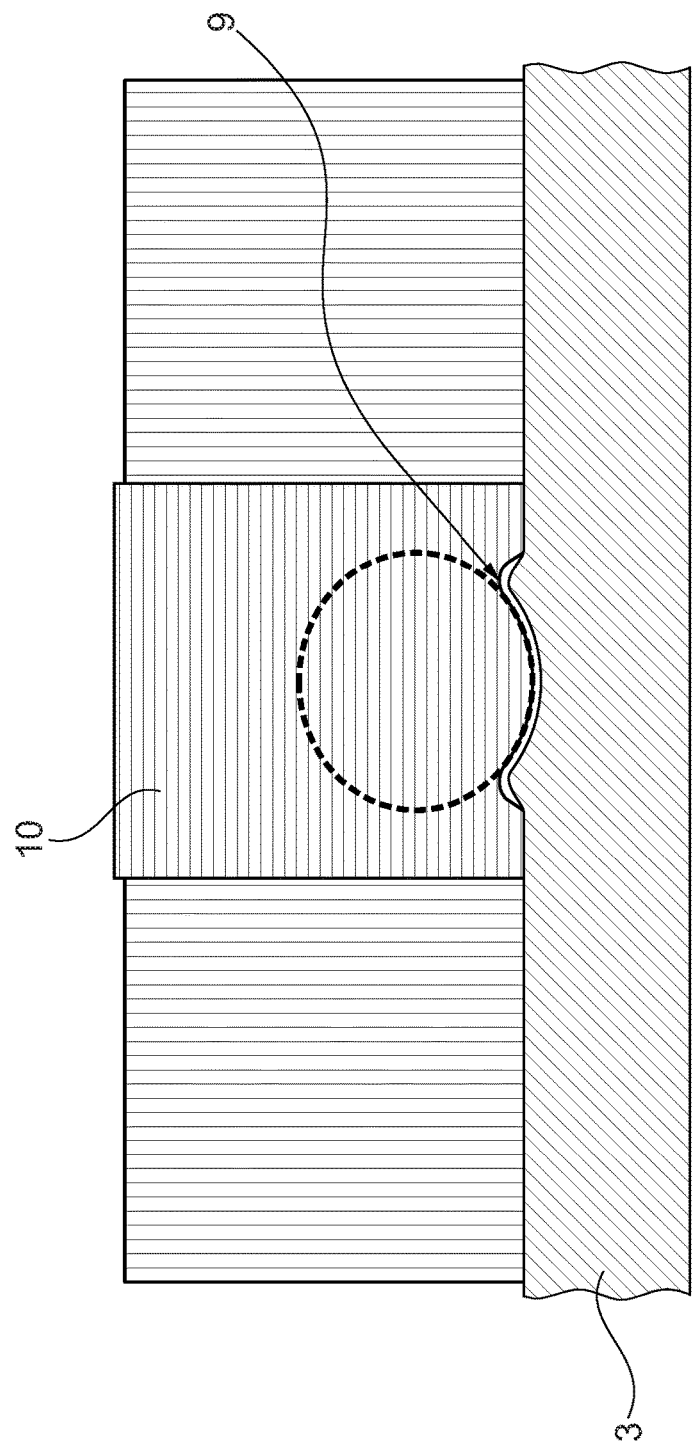

MOTOR VEHICLE STRUCTURAL COMPONENT AND CORROSION PROTECTING METHOD

CROSS-REFERENCE TO RELATED APPLICATIONS

This application claims priority to German Patent Application No. 102018213001.9, which was filed on 3 Aug. 2018 and is incorporated herein by reference in its entirety.

TECHNICAL FIELD

This disclosure relates generally to a motor vehicle structural component that can include, for example, two metal sheets placed flat against each other and joined together by spot welds. Corrosion-protecting coating material can be introduced into gaps between the metal sheets.

BACKGROUND

Some motor vehicle structural components can include metal sheets partly resting against each other and joined together. Corrosion can occur in the gaps between such metal sheets.

One such motor vehicle structural component is described in DE102012013882A1. This component consists of two metal sheets resting against each other and joined together by multiple spot welds. Gaps remain between the two metal sheets. A coating is supposed to be introduced into the gaps as corrosion protection. The gaps have a width in the range of 0.2 to 0.6 millimeters, while the coating, which is introduced in the form of a cathodic dip painting into the gaps, has a thickness of 10 to 40 micrometers.

Complete coating of the gaps can be difficult due, in part, to the distances which the coating material needs to travel in the gaps. Furthermore, air inclusions or various other impediments can prevent the coating material from penetrating into the sometimes narrow gaps. Corrosion can occur in regions of the gaps uncovered by the coating material.

SUMMARY

An exemplary embodiment of the present disclosure provides improved motor vehicle structural components by mitigating corrosion in the gaps present between the metal sheets joined together.

In an exemplary embodiment, holes for the inflow of the coating material and for ventilation are provided in the region of the gaps in at least one of the metal sheets. Due to the holes, during the coating process the coating material can easily get into the gaps thanks to the short distance and the easy unhindered access. Air can escape from the gaps through the holes, so that a reliable and complete coating of the gaps can be achieved.

The holes formed in the metal sheets may be configured for example as round circular bores, which can be produced by punching, for example.

The size of the holes can be coordinated with the thickness of the metal sheets and the viscosity of the coating material. For typical exemplary applications, the holes can have a diameter of around 2 to 7 millimeters.

In another embodiment, the holes have any desired contour. This is especially suitable for laser-cut parts, such as boron parts, which are often laser trimmed in this way. The holes may depart from a circular shape and be configured so that they facilitate the drainage function and also do not reduce, or only slightly reduce the strength of the component. Alternatively, the holes may be already punched in the blanking process, so that after the drawing process, the holes may depart from the circular shape.

In an embodiment, the maximum width of the holes can be less than 8 mm. This sizing can help to ensure that even irregularly formed holes will not greatly weaken the component.

The holes can be configured in the metal sheet that is facing the inside of the vehicle. In this way, the exterior of the structural part may be kept smooth and enclosed.

The structural component is produced such that the gaps preferably have a width of around 0.3 to 0.7 millimeters.

In the exemplary embodiment, due to the inflow and ventilation holes, the gaps can be filled up entirely with the coating material, so that no unprotected spaces remain.

At least one of the two metal sheets can have elevations on the side facing toward the opposite metal sheet near the inflow and ventilation holes, so that the resulting gaps are defined in this way.

These elevations may be embossed in the metal sheet, for example.

The spacing between the spot welds can be from 25 to 40 millimeters. A known cathodic dip painting can be used as coating material.

At least one of the metal sheets joined together or both metal sheets preferably consist of manganese-boron steel or boron steel, which is high-strength and easily heat deformable.

The metal sheets may be provided with an aluminum-silicon coating. However, corrosion-protecting coating material, such as the cathodic dip painting, can be added to provide adequate corrosion protection for the metal sheets.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 2 illustrates a cross section along line II-II of FIG. 1 on enlarged scale.

FIG. 3 illustrates the production of elevations on one of the metal sheets by embossing, and FIG. 4 illustrates a cross section similar to FIG. 2 with the elevations present.

DETAILED DESCRIPTION

Figure 1:
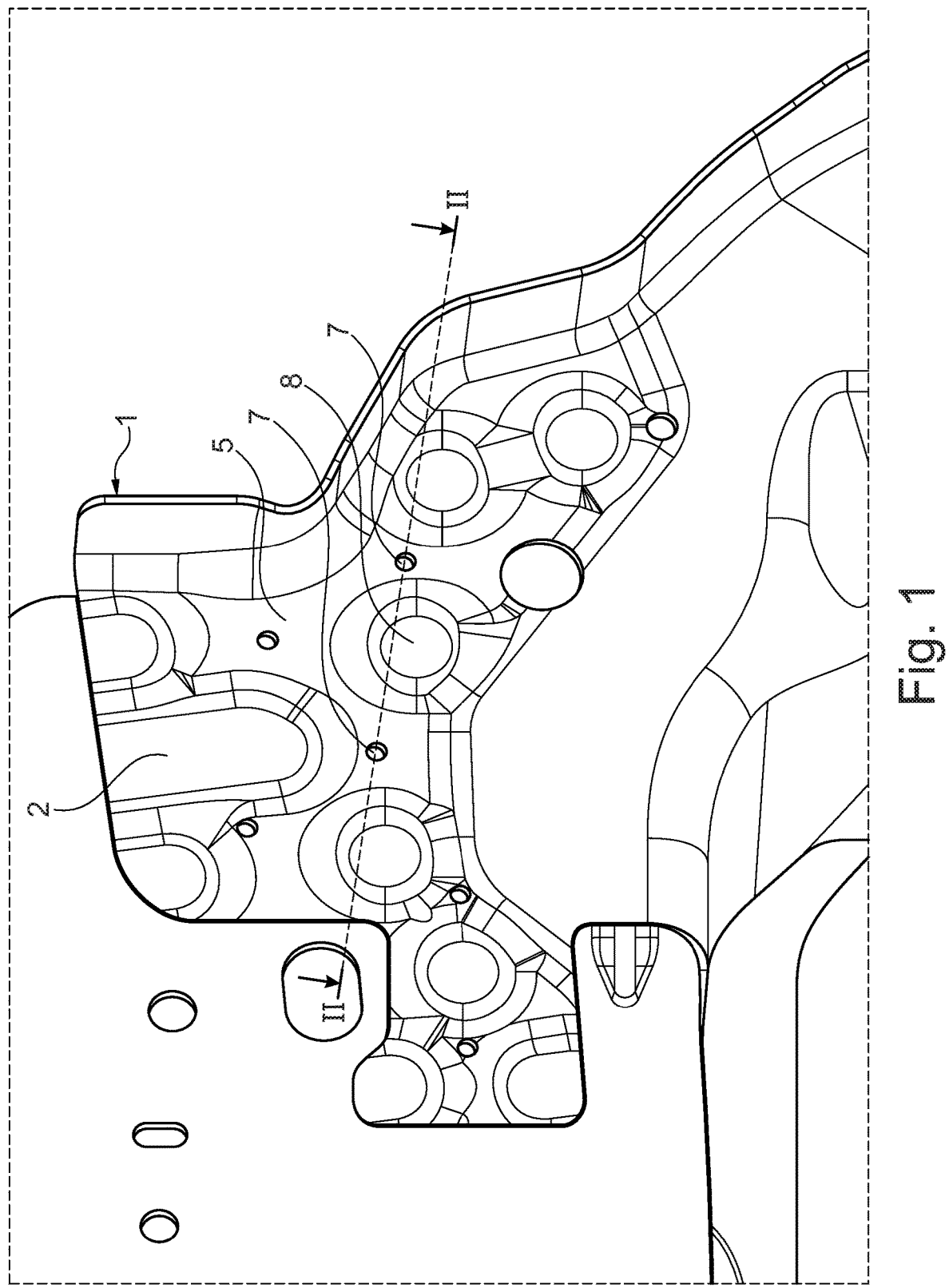
FIG. 1 illustrates a front view of a motor vehicle structural component.

A motor vehicle structural component can include, for example, two metal sheets placed flat against each other and joined together by spot welds. Corrosion-protecting coating material can be introduced into gaps between the metal sheets. This disclosure relates to filling gaps provided between the metal sheets in the regions between the spot welds.

The features and measures set out individually in the following description can be combined with each other in any technically advantageous manner to provide other embodiments of the present disclosure.

With reference to FIGS. 1 and 2, a motor vehicle structural component 1 according to an exemplary aspect of the present disclosure, includes two metal sheets 2 and 3 placed flat against each other. The two metal sheets 2 and 3 are joined together by spot welds 4 in this example. The metal sheets 2 and 3 can be a metal or a metal alloy.

In raised regions 5 between the spot welds 4, gaps 6 are provided between the two metal sheets 2 and 3.

To protect against corrosion, holes 7 provide for the inflow of coating material into the gaps 6 and for the ventilating of the gaps 6. The holes 7 are provided in the regions of the gaps 6 in the upper metal sheet 2 in the drawing. The holes 7 here are configured as round bores, having a diameter of around 2 to 7 millimeters.

The two metal sheets 2 and 3 are joined together such that the gaps 6 have a width of around 0.3 to 0.7 millimeters, so that the coating material can penetrate into the gaps 6 without any problem.

Due, in part, to the inflow and ventilation holes 7, the coating material can completely fill up the gaps 6 by virtue of the relatively short distances which the coating material needs to travel between the metal sheets 2 and 3, and also by virtue of the air inclusions escaping through the holes 7, so that no unprotected regions remain within the gaps. Especially when the coating material is applied by cathodic dip painting, the coating material can penetrate into the narrowest angles of the gaps 6.

As is seen in FIG. 1, the metal sheet 2 provided with the holes 7 includes indentations 8 for the spot welds 4. The spacing 11 between the spot welds 4 are around 25 to 40 millimeters, so that there are no difficulties, for example during an electrodip painting, in completely filling the gaps 6, because the spacing from the holes 7 to the regions of the spot welds 4 are relatively short.

The exemplary motor vehicle structural component 1 is composed of the two metal sheets 2 and 3 and is designed such that the holes 7 are situated in the metal sheet 2 directed toward the interior of the vehicle, so that the structural component 1 is closed toward the outside.

As shown in FIGS. 3 and 4, the lower metal sheet 3 in the drawing includes elevations 9 at the sides of the hole 7. The elevations 9 can hold open the respective gap 6 in the region of the holes 7. This helps to provide a minimum width of the gap 6 is guaranteed to ensure that the coating material can easily penetrate into the respective gap 6.

As can be seen in FIG. 3, the elevations 9 can be formed with the aid of an embossing tool 10 in the metal sheet 3.

In an exemplary embodiment, at least one of the metal sheets 2 and 3 generally consists of manganese-boron steel or boron steel, which has a high strength and is easily deformable. The metal sheets 2 and 3 may be provided with an aluminum-silicon coating.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A motor vehicle structural component, comprising:
a first metal sheet; and
a second metal sheet placed against the first metal sheet, the first and second metal sheets joined directly together in some areas,
wherein a gap is provided between the first and second metal sheets in the regions between the areas where the first and second metal sheets are joined together, the gap configured to receive a coating material,
wherein at least one of the first or the second metal sheets includes at least one hole, each hole opening to the gap and configured to convey an inflow of the coating material to the gap.

2. The motor vehicle structural component of claim 1, further comprising a plurality of spot welds that join the first and second metal sheets together, wherein at least one of the two metal sheets includes at least one elevation on a side of the metal sheet facing toward the opposite metal sheet, the at least one elevation a feature that is raised relative to areas of the side that are adjacent to the feature, the at least one elevation adjacent to the hole and spaced a distance from the plurality of spot welds.

3. The motor vehicle structural component of claim 2, wherein each of the spot welds is spaced from 25 to 40 millimeters from an adjacent spot weld.

4. The motor vehicle structural component of claim 1, wherein each hole is further configured to ventilate air from the gap.

5. The motor vehicle structural component of claim 1, wherein each hole is configured as a round circular bore.

6. The motor vehicle structural component of claim 1, wherein each hole has a maximum width that is less than 8 millimeters.

7. The motor vehicle structural component of claim 1, wherein each hole is situated in the metal sheet which is facing the inside of a vehicle.

8. The motor vehicle structural component of claim 1, wherein the gap is filled up entirely with the coating material.

9. The motor vehicle structural component of claim 1, wherein the coating material is a corrosion resistant coating material.

10. The motor vehicle structural component of claim 1, wherein the coating material is a cathodic dip painting.

11. The motor vehicle structural component of claim 1, wherein, adjacent the hole, at least one of the two metal sheets includes at least one elevation on a side of the metal sheet facing toward the opposite metal sheet, the at least one elevation a feature that is raised relative to adjacent areas of the side, the at least one elevation disposed between adjacent welds that join together the two metal sheets.

12. The motor vehicle structural component of claim 11, wherein the at least one elevation is embossed in the metal sheet.

13. The motor vehicle structural component of claim 12, wherein the first and second metal sheets have an aluminum-silicon coating.

14. A motor vehicle structural component, comprising:
a first metal sheet that faces an interior of a vehicle; and
a second metal sheet placed against the first metal sheet, the first and second metal sheets welded directly together in some areas, wherein a gap is provided between the first and second metal sheets in the regions between the areas where the first and second metal sheets are joined together, the gap configured to receive a corrosion resistant coating material,
wherein the first metal sheet includes at least one hole, each hole opening to the gap and configured to convey an inflow of the corrosion resistant coating material to the gap,
wherein, adjacent each hole, one of the first or second metal sheets includes at least one elevation projecting across the gap to the other of the first or second metal sheets, the at least one elevation raised relative to an adjacent area of the first or second metal sheet.

15. The motor vehicle structural component of claim 2, wherein the first sheet includes the at least one elevation, wherein each of the plurality of spot welds is spaced from the at least one elevation such that no portion of the at least one elevation is welded to the second sheet.

16. The motor vehicle structural component of claim 2, wherein at least the first metal sheet includes the hole, wherein the first metal sheet further includes indentations for the plurality of spot welds, the indentations spaced from the at least one elevation.

17. The motor vehicle structural component of claim 15, wherein no portion of the plurality of spot welds overlaps with the at least one elevation such that no portion of the at least one elevation is welded.

18. A motor vehicle structural component, comprising:
a first metal sheet that faces an interior of a vehicle;
a second metal sheet placed against the first metal sheet;
a plurality of spot welds that secure the first metal sheet to the second metal sheet welded; and
a plurality of indentations in the first sheet, the plurality of indentions aligned with the plurality of spot welds,
wherein a gap is provided between the first and second metal sheets in the regions between the areas where the first and second metal sheets are joined together by the plurality of spot welds, the gap configured to receive a corrosion resistant coating material,
wherein the first metal sheet includes at least one hole, each hole opening to the gap and configured to convey an inflow of the corrosion resistant coating material to the gap,
wherein, within the gap, one of the first or second metal sheets includes at least one elevation projecting across the gap to the other of the first or second metal sheets, the at least one elevation raised relative to an adjacent area of the first or second metal sheet.

\* \* \* \* \*